3,078,313
SELECTIVE HYDROBORATION
Herbert C. Brown, 1840 Garden St., West Lafayette, Ind.
No Drawing. Filed June 15, 1961, Ser. No. 117,261
13 Claims. (Cl. 260—606.5)

The present invention is concerned with a unique hydroboration reaction, praticularly wherein more selective attachment of a boron atom to a carbon atom in an olefinic molecule, is obtained.

It has long been known that certain hydroboration reactions can be conducted for the formation of organoborane compounds. For example, it is known that diborane can be reacted with a gaseaus olefin, such as ethylene or isobutene, to form triethylborane and triisobutylborane. More recently, certain improvements have been made in the reaction of diborane or $\cdot BH_3$ producers with an olefinic material which are described in my co-pending applications, Serial No. 680,933 filed August 29, 1957, now abandoned, Serial No. 77,504 filed December 22, 1960, Serial No. 680,934 filed August 29, 1957, and Serial No. 3,975 filed January 21, 1960. Briefly, it has been found that the reaction of diborane with an olefinic material is improved when conducted in the liquid phase. Further improvement is obtained when the reaction is performed in the liquid phase and also in the presence of certain catalytic materials, especially the glycol ethers, such as the dimethyl ether of diethylene glycol.

An inherent characteristic of the prior art reactions wherein diborane or the $\cdot BH_3$ producers are employed to effect the hydroboration is that there is little or no control over direction of the addition. This effect is particularly noted and of concern when olefinic materials containing more than 2 carbon atoms are employed. By way of further explanation, it has been found that in the course of the reaction of diborane or a $\cdot BH_3$ producer with an olefinic material, some of the boron becomes attached to one of the carbon atoms and some becomes attached to the other carbon atom of the doubly bonded carbon atoms in the molecule. Specifically, in the reaction of diborane with 1-hexene, essentially 94 percent conversion to tri-n-hexylborane and 6 percent conversion to tri-2-hexylborane is obtained. Similarly, in the reaction of diborane with styrene, 20 percent of the product constitutes alpha-styryl-borane product and 80 percent beta-styrylborane product. Thus, these inherent characteristics of the prior art reactions result in complex mixtures of products tending to complicate their usage and efficiency in other reactions toward other products, such as the alcohols, in some instances requiring tedious recovery procedures. It is therefore desirable to the industry to provide an improved method for the hydroboration of olefinic materials resulting in a more directive and selective course of the reactions.

Accordingly, an object of this invention is to provide an improved and more efficient method for the hydroboration of olefinic compounds. Another object is to provide a method for the selective production of triorganoboranes in higher yield and purity. A still further object is to provide an improved method of hydroboration wherein the boron atom becomes attached primarily and more efficiently only to one carbon atom of the two doubly bonded carbon atoms contained in an olefinic compound. A still further object is to provide a method for the selective hydroboration of mixtures of olefinic compounds. These and other objects will be apparent as the discussion proceeds.

Basically, the present invention is concerned with the formation of organoboranes by the reaction of an organoboron hydride with an olefinic compound.

Of the organoboron hydrides, the dialkylboron hydrides, particularly those wherein the carbon atom linked to the boron is a secondary carbon atom, and at least one carbon atom beta to the boron has two carbon groups attached thereto, are preferred, especially di(3-methyl-2-butyl)boron hydride or its dimer. These dialkyl boron hydrides have been found most effective in producing the directive effect of the reaction of a boron-hydrogen linkage with the doubly bonded carbon atoms of an olefinic compound. Further, any olefinc compound or mixtures thereof having at least one double bond between two carbon atoms can be employed, as discussed more fully hereinafter. While the temperature at which the reaction is conducted can be varied, it has been found that best results are obtained at temperatures between about 0 to 50° C. Additionally, further advantage in reaction rate is obtained when certain catalysts are employed, for example, the polyethers, especially the glycol ethers such as the dimethyl ether of diethylene glycol. Thus, by way of illustration of a typical embodiment of this invention, di(3-methyl-2-butyl)boron hydride is reacted with an olefinic compound, such as 1-hexene, at 0 to 50° C. in the presence of the dimethyl ether of diethylene glycol to produce di(3-methyl-2-butyl)-n-hexylborane with essentially no, or very minor amounts, of di(3-methyl-2-butyl)-2-hexylborane. In other embodiments of the present invention, due to the selectivity and directive effects of the reaction, separation of two or more olefins is effected by reaction of the organoboron hydride with a mixture of two or more different olefinic compounds. In a still further embodiment, the present process even achieves the selective and directive separation of a cis-isomer from a trans-isomer of an olefinic compound. With the foregoing brief description of certain embodiments of the present invention, further discussion hereinafter will serve to elaborate the invention as well as illustrating additional embodiments.

By the process of the present invention, a more efficient and directive hydroboration by the reaction of a boron-hydrogen bond with an olefinic compound is obtained. Rather than obtaining highly complex mixtures of isomeric organoboranes as the initial product of the reaction, essentially or predominantly and in enhanced proportion only one organoborane isomer is obtained. This is particularly advantageous for subsequent use of the organoborane as, for example, in the conversion thereof to the alcohol analogous to the olefinic compound. For example, when reacting 1-hexene with di-(3-methyl-2-butyl)boron hydride and subsequently oxidizing and hydrolyzing the resultant product, essentially pure 1-hexanol is recovered and separated from the 3-methyl-2-butanol with essentially no 2-hexanol being present. In contrast, when diborane or a $\cdot BH_3$ producer is reacted with 1-hexene and the resulting organoborane subsequently oxidized and hydrolyzed, a mixture of alcohols is obtained generally of the order of 94 percent 1-hexanol and 6 percent 2-hexanol. Even more dramatic effects are illustrated hereinafter with other olefinic compounds. A still further advantage of the present invention is that mixtures of olefins can be more efficiently and effectively reacted to remove one olefin from the mixture by virtue of the selective and directive hydroboration with the organoboron hydride. For example, a mixture containing 1-pentene and 2-pentene when reacted according to the present invention results in essentially a complete removal of the 1-pentene from the 2-pentene. An even more remarkable advantage of the present invention is that cis- and trans-isomers of olefinic compounds can be reacted to accomplish the selective removal of the more reactive cis-isomer from the trans-isomer. For example, when a commercial sample of 2-pentene containing 18 percent cis- and 82 percent trans-isomer was treated with an organoboron hydride according to the present invention, trans-2-pentene was recovered from the reaction mixture in a purity of at least 97 percent. Other advantages of the present invention will be evident as the discussion proceeds.

The present invention will be more readily understood and illustrated from the following examples.

EXAMPLE I

For comparative purposes, a series of runs were made reacting on the one hand diborane, and on the other hand, di(3-methyl-2-butyl)boron hydride with particular olefinic compounds under comparable and essentially analogous conditions to effect hydroboration. The products that were obtained were then oxidized and hydrolyzed with an alkaline hydrogen peroxide solution to form the alcohol derivatives of the resulting triorganoborane. The alcohols were then fractionally distilled at reduced pressure and identified. The following illustrates the procedure employed in each instance.

Into a reactor equipped with a condenser and a pressure-equilibrated dropping funnel were placed 80 ml. of the dimethyl ether of diethylene glycol, 23.1 g. (0.33 mole) of 2-methyl-2-butene and 4.8 g. (0.125 mole) of sodium borohydride. This mixture was cooled by an ice bath and then 23.5 g. of boron trifluoride etherate (0.165 mole) was added drop-wise to the reaction mixture with agitation over a period of 30 minutes. In this manner, essentially 0.165 mole of di(3-methyl-2-butyl)-boron hydride was obtained. After standing for an additional hour at 0° C., the hydroboration was performed by adding 20.1 g. (0.15 mole) of p-methoxystyrene ($n_D^{20}$ 1.5601) to the di(3-methyl-2-butyl)boron hydride reaction mixture over a period of 5 minutes. The reaction mixture was permitted to warm to room temperature over a period of approximately 2 hours. It was then oxidized with alkaline peroxide, 50 cc. of a 3 N solution of sodium hydroxide, followed by 50 cc. of 30 percent hydrogen peroxide. The reaction mixture was then extracted with ether and the ether extract washed 4 times with water to remove the dimethyl ether of diethylene glycol, dried over anhydrous magnesium sulfate, and distilled. There was obtained 18.2 parts (80 percent yield) of 2-(p-anisyl)-ethanol, B.P. 138–140° at 10 mm., M.P. 27–28° C. Gas chromatographic analysis indicated a purity of at least 98 percent.

For the reaction of diborane with the indicated olefins, the above procedure is typical and was followed except that no 2-methyl-2-butene was employed and the diborane which was generated from the sodium borohydride and boron trifluoride was bubbled through a solution of the indicated olefin in the dimethyl ether of diethylene glycol.

The following table sets forth the results obtained illustrating the directive effects of hydroboration of olefinic compounds with di(3-methyl-2-butyl)boron hydride in contrast to the hydroboration with diborane.

TABLE I

*Directive Effects in the Hydroboration of Unsymmetrical Olefins With Diborane and Di(3-Methyl-2-Butyl)-Boron Hydride*

| Olefin | Hydroborating agent | Temp., °C. | Time, Hrs. | Alcohol Distribution [a] | | |
|---|---|---|---|---|---|---|
| | | | | 1-ol | 2-ol | 3-ol |
| 1-Hexene | Diborane | 25 | 1 | 94 | 6 | |
| | R₂BH | 0 | 1 | 99 | 1 | |
| Styrene | Diborane | 25 | 1 | 80 | 20 | |
| | R₂BH | 25 | 2 | 98 | 2 | |
| p-Methoxystyrene | Diborane | 25 | 1 | 91 | 9 | |
| | R₂BH | 25 | 2 | [b] 98 | 2 | |
| Trans-4-methyl-2-pentene | Diborane | 25 | 1 | | 57 | 43 |
| | R₂BH | 25 | 12 | | 95 | 5 |
| Cis-4-methyl-2-pentene | R₂BH | 25 | 12 | | 97 | 3 |

[a] The total yields, indicated by the gas chromatographic analysis, were 85–90 percent.
[b] The product, 2-(p-anisyl)-ethanol, was isolated in 80 percent yield.

The above table illustrates the directive effect of the hydroboration reaction with an organoboron hydride quite vividly, thus illustrating the uniqueness of the present invention. As indicated, with alpha or primary olefinic compounds, essentially all of the boron attaches itself to the primary or "one" carbon atom whereas, in contrast, with diborane a significant amount of boron to secondary or the number two carbon atom is obtained. Likewise, when the olefinic compound is an internal olefin, the effect is even more pronounced in that in this instance with diborane, essentially equivalent amounts of boron-carbon linkages at both doubly bonded carbons, e.g. the 2 and 3 positions are obtained, whereas with the diorganoboron hydride reagents, essentially only linkages of boron to only one of the two doubly bonded carbon atoms are obtained.

The organoboron hydride employed as a reactant in the process of the present invention is an organoboron hydride or its dimer which contains only organo groups, boron, and hydrogen, with the organo groups being linked to the boron via a carbon atom. Thus, by this definition, the organoboron hydride has at least one organo group and at least one hydrogen atom linked to the boron. It will therefore be evident that diorganoboron hydrides, organoboron dihydrides, or the dimers of each of these since such normally exist as dimers, and cycic organoboron hydrides are included wherein various functional groups can be attached to the carbon atoms of the organo groups, especially such functional groups which are preferably unreactive in the system. These organoboron hydrides can be obtained, for example, by the methods of hydroboration of an olefinic compound (e.g. a compound having at least one carbon to carbon double bond) with diborane or ·BH₃ producers by procedures well known and as described, for example, in my co-pending applications, Serial No. 680,933 and 680,934, and issued U.S. Patents 2,925,441, 2,925,438, and 2,925,437, among others. Other methods for obtaining the organoboron hydride reactant can also be used, however. Thus, typical examples of the organoboron hydrides which can be employed in the present invention include:

diethyl boron hydride (or its dimer, tetraethyl diborane),
ethyl boron dihydride (or its dimer bis-diethyl diborane),
dipropyl boron hydride,
dibutyl boron hydride,
di-2-hexyl boron hydride,
didecyl boron hydride,
di(2-methyl-1-butyl)boron hydride,
di(3-methyl-2-butyl)boron hydride,
di(2-methyl-1-pentyl)boron hydride,
di(2-methyl-3-pentyl)boron hydride,
di(3-methyl-2-pentyl)boron hydride,
di(3-ethyl-2-pentyl)boron hydride,
di(2-cyclohexyl-1-pentyl)boron hydride,
di(2-phenyl-1-pentyl)boron hydride,
di(2-methylcyclohexyl)boron hydride,
2-methyl-1-butyl boron dihydride,
2-methyl-1-pentyl boron dihydride,
3-methyl-2-butyl boron dihydride,
2-methyl-3-pentyl boron dihydride,
3-methyl-2-pentyl boron dihydride,
3-ethyl-2-pentyl boron dihydride,
2-methyl-1-decyl boron dihydride,
2-methylcyclohexyl boron dihydride,
diphenyl boron hydride,
ditolyl boron hydride,
dicyclohexyl boron hydride,
alpha-pinyl boron dihydride,
di-alpha-pinyl boron hydride,
di-beta-pinyl boron hydride,
beta-pinyl boron dihydride,
camphyl boron hydride,
dicamphyl boron hydride,
cholestyl boron dihydride,
dicholestyl boron hydride, and the like. Thus, the organoboron hydrides can be depicted by the following representative structure:

or its dimeric form wherein R is an organo group and R' is an organo group, preferably the same as R, or hydrogen. The organic groups can be of varying chain length as, for example, up to and including about 40 carbon atoms. It is also possible to utilize organoboron compounds which are cyclic in nature and derivable, for example, from a diene. In these compounds, the organoboron hydride will contain the organo group in the ratio of 1-diene to 1-boron as contrasted to the general ratio of 2:1 for the compounds previously discussed. These compounds will have the representative structure:

wherein R is a divalent organo radical as discussed herein. For example, such compounds derived from diborane or ·BH$_3$ producers reacting with butadiene, pentadiene, isoprene, d-limonene, camphene, caryophylene and the like as, for example (1-borocyclopentane) hydride, (1-borocyclohexane)hydride, and the like. As indicated, the organoboron hydrides can have various functional substituents contained therein as, for example, the halogens, amino, ether linkages, nitro groups, ester groups, and the like, especially such functional groups which are essentially non-reactive in the system. Of the aforementioned organoboron hydrides the diorganoboron hydrides, especially wherein both organo groups are identical, have been found most suitable and thus are preferred. In this regard, it has also been found that the diorgano boron hydrides in which the carbon atoms of the organo groups are primary carbon atoms having 2 carbon linkages attached to the carbon atom beta to the boron atom; or the carbon atom of the organo groups linked to the boron are secondary, or tertiary carbon atoms result in greater selectivity and directive effect in the hydroboration reaction. Particularly effective diorganoboron hydrides employed in the reaction are the dialkyl boron hydrides wherein each alkyl group has up to and including about 8 carbon atoms, the carbon atom attached to the boron is a secondary carbon atom, and at least one carbon atom beta to the boron atom has at least 2 carbon atoms attached thereto. These compounds have been found most effective because of their even greater steric, selective, and directive effects in the hydroboration. Typical examples of especially preferred dialkyl boron hydrides as defined include di(3-methyl-2-butyl)boron hydride, di-(2-methyl-3-pentyl)boron hydride, di(3-ethyl-2-butyl)-boron hydride, di(2-ethyl-3-pentyl)boron hydride, and di(3-ethyl-2-pentyl)boron hydride.

The olefinic compound employed as a reagent is subject to considerable latitude and, in general, any olefinic compound is employable. The term "olefinic" as used herein is intended to refer to organic compounds which owe their unsaturation to the presence of one or more carbon to carbon double bonds. In the sense in which this term is used herein aromatic rings, such as benzene and toluene, and alicyclic rings, such as cyclohexane, are not unsaturated or olefinic, however, they may be present in the olefinic compound as inert substituents. Thus, the process of this invention is applicable for the conversion to organoboron compounds from olefinic compounds, such as propylene, cis- and trans-2-butene, 1-butene, 1-pentene, 2-pentene, 2-methyl-1-butene, 2-methyl-2-butene, 2-methyl-1-pentene, 2-methyl-2-pentene, 3-hexene, 1-diisobutylene, the decenes, butadiene, pentadiene, isoprene, hexadiene, cyclic and polycyclic olefinic materials, such as cyclopentene, cyclohexene, cycloheptene, pinene, styrene, terpenes, and other olefinic compounds, such as 3-methylcyclopentene, 4-methylcyclopentene, 4-vinylcyclohexene, the linonenes, 2,2,4-trimethyl-1-pentene, alpha-methylstyrene, cis-phenylmethylethylene, cis-stilbene, 1-methylcyclopentene, 1-methylcyclohexene, Δ$^3$-p-methene, 3-hexenoic ethyl ester, crotylmethyl ether, ethyl oleate, bicycloheptadiene, (p-nitrophenyl)-propene, (p-carbethoxyphenyl)-propene, phenylpropene, (2-methylphenyl)-propene, methylmethacrylate, (m-nitrophenyl)-propene, crotonaldehyde, 1-nitrobutene-2, crotylethyl ether, crotylbutylether, cholestenes, norbornene, steroids, such as cholesterol, the coprostenes, cholestenone, ergosterol, stigmasterol, testosterone, cortisone, stilbesterol, and the like; alkaloids, as for example, myosmine, galipine, leucenol aborine, berberine, sinomenine, and codeine, and the like. Thus, the term "olefinic organic compound" also includes such substituted olefins as nitro olefins, halo olefins (e.g. allyl chloride, crotyl chloride, etc.) olefinic ethers such as the alkenyl alkyl ethers, olefinic acid chlorides, olefinic carboxylic esters (e.g. alkyl esters of alkenyl carboxylic acids such as ethyl oleate), olefinic boroate esters, etc. In general, such olefinic materials will have up to about 40 carbon atoms and higher. The olefins in which the double bond is internal, that is, both doubly bonded carbon atoms are non-terminal, are preferred.

The temperature at which the process is conducted is subject to considerable latitude. In general, however, temperatures between about −10 to 100° C. are employed. Best results are obtained at temperatures between 0 to 50° C. with, if desired, sufficient pressure to initially have present a liquid phase system. The process can also be conducted in the presence of various inert solvents, if desired, such as the hydrocarbons, amines, especially the tertiary amines, or a pre-formed portion of the organoboron product as well as catalytic materials discussed hereinafter.

A particularly effective method to conduct the process of this invention is to employ certain materials which catalyze the reaction of the olefinic material with the organoboron hydride. To illustrate the type of materials which may be used as catalysts, the following list is offered, but it is to be understood that the list is illustrative only and is not to be construed as limiting:

(A) Ethers, particularly saturated ethers such as the alkyl ethers, e.g. ethyl ether, the dimethyl ether of diethylene glycol, diisopropyl ether, diamyl ether, diethyl ether of diethylene glycol, dimethoxyethane, and the like; saturated cyclic ethers such as tetrahydrofuran, dioxane, etc.; and aromatic ethers such as anisole, phenetole, and the like.

(B) Organic esters such as alkyl esters of alkanoic acids or aromatic acids, e.g. ethyl acetate, ethyl benzoate.

(C) Inorganic esters such as the alkyl borates and silicates, e.g. trimethyl borate [B(OCH$_3$)$_3$], triethyl borate, triisopropyl borate, ethyl silicate.

(D) Sulfur derivatives such as the alkyl sulfides and sulfones, e.g. ethyl sulfide, methyl ethyl sulfide, diethyl sulfone, tetrahydrothiophene.

(E) Nitro derivatives such as the nitro alkyl and nitro aryl compounds, e.g. nitromethane, nitrobenzene.

As can be seen from the above list, the materials which can be used as catalysts in the present invention are weak donor molecules or weak Lewis bases which are capable of forming unstable complexes or addition compounds with Lewis acids such as diborane and boron fluoride. While any group VI atom could be present in the weakly basic organic compound catalyst, preferably the catalyst will contain oxygen or sulfur. Even water or alcohols can be used as a catalyst, but they react with boron-hydrogen bonds to form boric acid or boric acid esters and hydrogen and thus involve a loss. Those catalysts which are liquid under the reaction conditions are preferred. The catalysts can be employed in varying amounts since the catalytic effect is exhibited when minor amounts such as 0.1 part by weight of catalyst per part by weight of the organoboron hydride is employed as well as solvent quantities such as equal parts by weight and higher of the catalyst and organoboron hydride.

The proportion of the reagents employed is subject to some latitude, but in general is dependent upon the number of B–H bonds in the organoboron hydride. Ordinarily, at least one mole of the olefinic compound for each B–H bonding in the organoboron hydride is employed. Excess amounts can, of course, be employed and recycling effected, if desired, although excesses above about 10 percent generally are not practical. While such need not be the case, in general, it is preferable that the olefinic compounds be different in structure and number of carbon atoms from the organo groups of the organoboron hydride since better selectivity is obtained.

The following examples will illustrate additional embodiments of the invention.

EXAMPLE II

In a 250 ml. flask fitted with a magnetic stirrer and dropping funnel was placed 0.200 mole of d-alpha-pinene ($[\alpha]_D^{20}=+46°$), 0.075 mole of sodium borohydride and 100 ml. of the dimethyl ether of diethylene glycol. The flask was flushed with nitrogen and through the dropping funnel was added 0.100 mole of boron trifluoride-ethyl etherate over a period of 1 hour. To the resulting reaction mixture containing the di-$\alpha$-pinyl boron hydride product in suspension was added 0.100 mole of cis-2-butene and the mixture was permitted to stand overnight. The solid di-$\alpha$-pinyl boron hydride disappeared as it reacted to form di-$\alpha$-pinyl-sec-butylborane, soluble in the dimethyl ether of diethylene glycol.

The product was oxidized with alkaline hydrogen peroxide and distilled. There was obtained an 80 percent yield of l-2-butanol, B.P. 98° at 744 mm., $n_D^{20}$ 1.3975, $[\alpha]_D^{20}$ —11.8°. This compares with the highest reported rotation for this compound of —13.5° reported by Lerou and Lucas, J. Am. Chem. Soc., 73, 41 (1951).

If l-$\alpha$-pinene is used in place of d-$\alpha$-pinene in the above example, then d-2-butanol is produced.

EXAMPLE III

Employing the procedure of Example II, cis-3-hexene was reacted with the di-$\alpha$-pinyl boron hydride and the di-$\alpha$-pinyl-3-hexyl borane produced converted to 3-hexanol. The 3-hexanol had a boiling point of 135 to 136° C., $n_D^{20}$ 1.4148, $[\alpha]_D^{20}$ —6.5°. The yield obtained was 80 percent. The rotation of the product compares with the highest value recorded for this compound in the literature, $[\alpha]_D^{20}$ —7.3°, J. Kenyon and R. Poplett, J. Chem. Soc., 1945, 273.

EXAMPLE IV

Again employing the procedure of Example II, the di-$\alpha$-pinyl boron hydride was reacted with norbornene and the product oxidized to recover the exo-norborneol which had a melting point of 125 to 126°, $[\alpha]_D^{20}$ —.0°, acetate $[\alpha]_D^{20}$ +7.9°, as compared to the literature values, M.P. 126–126.8°, $[\alpha]_D^{20}$ —2.41°, acetate 10.4°, from S. Winstein and D. Trifan, J. Am. Chem. Soc., 74, 1154 (1952).

EXAMPLE V

Di-$\beta$-pinyl boron hydride is obtained by adding 4 moles of optically active $\beta$-pinene to 1 mole of diborane in tetrahydrofuran at room temperature for about 1 hour. Then, essentially 2 moles of trans-2-butene is added to the mixture and reaction continued for about 1 hour. In this manner, di-$\beta$-pinyl-2-butylborane is obtained in good yield having optical activity which, upon oxidation according to the procedure of Example II, results in the highly optically active 2-butanol.

Similar results are obtained when the above is repeated substituting 2-pentene, 2-methyl-2-pentene, 2-octene, and the like olefinic materials for trans-2-butene.

EXAMPLE VI

Optically active camphyl boron dihydride is reacted with ethyl oleate in slight excess in the presence of tetrahydrofuran as a solvent and catalyst. The corresponding hydroborated product is obtained having a high optical activity which, upon oxidizing, results in the respective alcohols of ethyl oleate and camphene.

EXAMPLE VII

One mole of the optically active di-$\alpha$-pinyl boron hydride produced as in Example II is reacted with essentially 1 mole of $\Delta^3$-p-menthene at 50° C. for one hour employing the dimethyl ether of diethylene glycol as solvent. In this manner, di-$\alpha$-pinyl-3-p-menthyl borane is obtained. Upon oxidation as in Example II and separation of the alcohols formed by distillation, optically active menthol is obtained in good yield.

Similar results are obtained when optically active di-$\beta$-pinyl boron hydride, dicamphyl boron hydride, caryophylyl boron hydride and the like optically active organoboron hydrides are substituted for the di-$\alpha$-pinyl boron hydride in the above example.

EXAMPLE VIII

Essentially 1 mole of optically active di-$\beta$-pinyl boron hydride obtained as described in Example V is reacted with essentially 1 mole of $\Delta^5$-cholestene at 75° C. employing tetrahydropyran as solvent and catalyst for about 1 hour. At the end of this period, the reaction mixture is oxidized and distilled as in Example II whereby optically active 6-cholestanol is obtained in high yield and purity.

The Examples II through VIII above illustrate particularly unique embodiments of this invention wherein an optically active organoboron hydride is reacted with an olefinic compound in which at least one of the carbon atoms thereof becomes asymmetric upon bonding to the boron and that the triorganoborane products produced can be converted to optically active alcohols.

EXAMPLE IX

Di(3-methyl-2-butyl)boron hydride was prepared as in Example I with exception that tetrahydrofuran was employed as the solvent rather than the dimethyl ether of diethylene glycol. 25 mmoles of undecenoic acid was treated with a solution of 50 mmoles of the di(3-methyl-2-butyl)boron hydride in tetrahydrofuran at 0° C. After 30 minutes, the reaction mixture was then oxidized and hydrolyzed and the resulting product recrystallized from water. In addition to the 3-methyl-2-butanol, there was obtained 20.6 mmoles, 82 percent yield, of 11-hydroxyundecanoic acid, M.P. 68–69°, which compares with that reported in the literature.

EXAMPLE X

Di(3-methyl-2-butyl)boron hydride was produced essentially as described in Example I. Employing 20 mmoles of di(3-methyl-2-butyl)boron hydride in 40 ml. of the dimethyl ether of diethylene glycol, there was added 10 mmoles of 3-methylcyclopentene to the reaction mixture with agitation. The mixture was kept at 0° C. for one hour and then at room temperature for 24 hours. The reaction mixture was then oxidized and hydrolyzed as in Example I. It was then also extracted with ether and subsequent to the evaporation of the ether, the residue was oxidized with chromic acid-sulfuric acid mixture to the ketone. The ketones formed were extracted with ether and dried. Analysis of the dried ether extract by vapor phase chromatography employing a 2-meter Ucon polar column indicated the mixture to comprise 40 percent of 2-methyl, and 60 percent of 3-methylcyclopentanone with the yield by internal standard being 75 percent. In contrast to these results, when diborane is employed as the hydroborating agent, a greater proportion of the 2-methylcyclopentanone in admixture with the 3-methylcyclopentanone is obtained.

EXAMPLE XI

Employing the procedure of Example X, an equivalent amount of 3,3-dimethylcyclohexene was substituted for the 3-methyl-cyclopentene with all other conditions being essentially the same. In this run, however, rather than oxidizing with the chromic acid-sulfuric acid treatment, the alcohols were recovered as described therein. Analysis of the ether extract of the alcohols, again by vapor phase chromatography in the Ucon column at 160° and 15 p.s.i. pressure, indicated 40 percent 2,2-dimethylcyclohexanol and 60 percent 3,3-dimethylcyclohexanol being obtained with a yield of about 90 percent. In contrast to these results, when diborane is employed in place of the di-3-methyl-2-butylborane, essentially equivalent amounts of both alcohols are obtained.

EXAMPLE XII

Di(2-methyl-1-butyl)boron hydride is obtained by reacting 210 parts of 2-methyl-1-butene with 22 parts of diborane. When the di(2-methyl-1-butyl)boron hydride is reacted with essentially 1 mole of 3-methyl-1-butene in tetrahydropyran at 50° C. for 1 hour, di(2-methyl-1-butyl)-3-methyl-1-butylborane is obtained with only minor amounts of di(2-methyl-1-butyl)-3-methyl-2-butylborane being present.

EXAMPLE XIII

When Example XII is repeated substituting 44 parts of diborane (thus doubling the amount of diborane), 2-methyl-1-butyl boron dihydride is obtained in good yield which upon reaction with 3-methyl-1-butene produces as the major product, 2-methyl-1-butyl-di(3-methyl-1-butyl)borane.

EXAMPLE XIV

When di-α-styryl boron hydride is reacted with 1-octene in the diethyl ether of diethylene glycol at 90° C. for 2 hours, di-α-styryl-1-octylborane is obtained in good yield.

EXAMPLE XV

When 144 parts of 1-methylcyclohexene are reacted with 15 parts of diborane in the diethyl ether of diethylene glycol at 30° C. for one hour, di(2-methyl-1-cyclohexyl)boron hydride is obtained in good yield. By adding to the reaction mixture p-chloro-styrene and continuing the reaction for 4 hours at the same conditions, di(2-methyl-1-cyclohexyl)-β-(p-chlorophenyl)ethylborane is obtained in good yield.

EXAMPLE XVI

Equimolar quantities of di(3-methyl-2-butyl)boron hydride and ethyl-4-butenoate are reacted at 30° C. employing tetrahydrofuran as the solvent for 2 hours. The reaction mixture is then oxidized as in Example I and fractionated whereby 3-methylbutanol-2 and 4-hydroxyethylbutanoate are obtained in good yield.

From the above discussion, it will be evident that other organoboron hydrides, other olefinic compounds, and other catalytic materials can be substituted as set forth hereinbefore to produce similar directive and selective hydroboration at temperatures preferably between 0 to 100° C.

The following example will illustrate still further embodiments of the present invention.

EXAMPLE XVII

A series of runs were made in which di(3-methyl-2-butyl)boron hydride in the dimethyl ether of diethylene glycol was reacted with a number of olefinic compounds at 0° C. The results obtained are shown in the following table.

TABLE II

*Reaction of Various Olefins With Di(3-Methyl-2-Butyl)-Boron Hydride in the Dimethyl Ether of Diethylene Glycol at 0°*

| Olefin [a] | Olefin reacted, percent | | | | |
|---|---|---|---|---|---|
| | 0.5 hr. | 1.0 hr. | 2 hr. | 4 hr. | 24 hr. |
| 1-Hexene | 100 | | | | |
| 3-Methyl-1-butene | 99 | | | | |
| 2-Methyl-1-butene | 98 | | | | |
| 3,3-Dimethyl-1-butene | 93 | 93 | | | |
| Cyclopentene | 76 | 85 | 90 | | |
| cis-2-Hexene | 62 | 79 | 93 | | |
| trans-2-Hexene | 39 | 50 | 64 | 84 | 97 |
| trans-4-Methyl-2-pentene | 21 | 32 | 46 | 64 | 91 |
| Cyclohexene | 15 | 25 | 31 | 38 | |
| 1-Methylcyclopentene | 12 | 19 | 25 | 34 | |
| trans-4,4-Dimethyl-2-pentene | 7 | 10 | 13 | 20 | 30 |
| 2-Methyl-2-butene | 5 | 8 | 11 | 11 | |
| 2,3-Dimethyl-2-butene | 4 | 6 | 7 | 7 | |
| 1-Methylcyclohexene | 4 | 6 | 7 | 7 | |

[a] Olefin concentration was 0.5 M. An equivalent quantity of di(3-methyl-2-butyl) boron hydride was used, partially in suspension.

The above results indicate not only the directive effect of employing an organoboron hydride, especially the hereinbefore described dialkyl boron hydrides, for hydroboration, but also illustrate another embodiment of the present invention wherein the hereinbefore described organoboron hydrides can be reacted with mixtures of at least 2 different olefins to obtain selective reactivity and thus separation thereof. The conditions employed are essentially as described hereinbefore. In this instance, however, it is preferable to employ the mixtures in amount essentially equivalent to one mole of the olefin compound desired to be removed from the mixture of olefinic compounds per B–H bonding in the organoboron hydride reactant for best results. From the data, it is apparent that the reactivity of the indicated olefins toward an organoboron hydride such as di(3-methyl-2-butyl)boron hydride decreases in the order: 1-hexene≧3-methyl-1-butene>2-methyl-1-butene>3,3-dimethyl-1-butene>cyclopentene≧cis-2-hexene>trans-2-hexene>trans-4-methyl-2-pentene>cyclohexene≧1-methylcyclopentene>2-methyl-2-butene>1-methylcyclohexene≧2,3-dimethyl-2-butene. Thus, it is evident that one can employ mixtures of any of these olefinic materials exhibiting the different reactivities to effect a separation.

The following example further illustrates this embodiment of the invention.

EXAMPLE XVIII

In this example, di(3-methyl-2-butyl)boron hydride was reacted with indicated olefins in the dimethyl ether of diethylene glycol at 0° C. for certain times. At the indicated times, the residual or unreacted olefin was determined. The results obtained with particular mixtures of olefins are set forth in the following table.

TABLE III

*Competitive Reactions of Olefin Mixtures With Di(3-Methyl-2-Butyl)Boron Hydride in the Dimethyl Ether of Diethylene Glycol at 0° C.*

| Olefin mixture | Olefin mmoles | R₂BH, mmoles | Residual olefin, mmoles [a] | | | |
|---|---|---|---|---|---|---|
| | | | 0.5 hr. | 1 hr. | 3 hr. | 10 hr. |
| 1-Pentene | 43 | [b] 50 | 0.4 | | | |
| 2-Pentene | 43 | | 38.2 | | | |
| 1-Hexene | 43 | [b] 50 | 0 | | | |
| Cyclohexene | 43 | | 36.5 | | | |
| Cyclopentene | 43 | [b] 50 | 17.6 | 11.2 | | 2.2 |
| Cyclohexene | 43 | | 38.7 | 37.8 | | 36.1 |
| 2,4,4-Trimethyl-1-pentene | 15 | [b] 50 | 4.8 | 3.0 | 0 | |
| 2,4,4-Trimethyl-2-pentene | 85 | | 85 | 82.5 | 79 | |
| 1-Pentene | 50 | [c] 55 | 6.5 | | | |
| 2-Methyl-1-pentene | 50 | | 45 | | | |
| 4-Methyl-1-pentene | 50 | [c] 55 | 10.5 | 10.5 | | |
| 2-Methyl-1-pentene | 50 | | 39.0 | 39.0 | | |

[a] The olefins were analyzed in an adiponitrile column. For the separation of 2,4,4-trimethyl-1-pentene and 2,4,4-trimethyl-1-pentene, a Ucon Polar column was utilized.
[b] The olefin mixture was added rapidly to the reagent.
[c] The reagent was added to the olefin mixture.

The above data illustrate the preferential and selective reaction, particularly at reaction times of about ½ hour of the olefinic compounds shown in the respective pairs. While it will now be apparent that varying reaction times can be employed depending on the desired separation, in order to obtain best results in this type of selectivity, the reaction of the organoboron hydride with the mixture of olefinic compound is generally performed at periods of less than about 3 hours. Further, this technique is especially applicable to the separation of a primary olefin, that is, an alpha-olefin, from an internal olefin, that is an olefin wherein the double bond is not between two terminal carbon atoms, and therefore such mixtures are particularly preferred. Of course, the olefinic compound that reacts with the organoboron hydride forms the corresponding triorganoborane. From the above data, it is also illustrated that the proportion of each olefinic compound contained in the mixture can be varied and is not critical.

Similar selectivity of reactivity is obtained when other organoboron hydrides as discussed hereinbefore and mixtures of olefinic compounds are substituted in the above examples illustrated by Table III.

A still further embodiment of this invention is the remarkable finding that there is a difference in reactivity of the organoboron hydrides, especially the preferred dialkyl boron hydrides, with mixtures of isomeric olefinic compounds, especially mixtures of cis- and trans-olefins, particularly of the same number of carbon atoms. Here again, the conditions of reaction as described hereinbefore are quite suitable. However, for best results, it is preferable to employ the mixture in amount essentially equivalent to one mole of the olefinic compound desired to be separated per B–H bonding contained in the organoboron hydride reagent.

The following example illustrates this particular embodiment of the present invention.

EXAMPLE XIX

Di(3-methyl-2-butyl)boron hydride was reacted with a mixture of cis- and trans-2-pentene in the dimethyl ether of diethylene glycol at 0° C. Here again, the unreacted olefin was determined at particular reaction periods by gas chromatographic analysis of aliquots from the reaction mixture. The results obtained are presented in the following table.

TABLE IV

*Reaction of Di(3-Methyl-2-Butyl)Boron Hydride With Cis- and Trans-2-Pentene in the Dimethyl Ether of Diethylene Glycol at 0°*

| Time, hr. | Residual olefin, percent | | Yield of trans-2-Pentene, percent |
|---|---|---|---|
| | cis | trans | |
| 0 | 18 | 82 | |
| 0.25 | 10 | 90 | 83 |
| 0.50 | 4 | 96 | 66 |
| 0.75 | 3 | 97 | 62 |
| 1.0 | 2 | 98 | 55 |

Thus, as indicated, starting with a mixture containing 18 percent cis- and 82 percent trans-2-pentene, in one hour's time only 2 percent of the cis-isomer remained with the remainder having reacted to form di(3-methyl-2-butyl)-2-pentylborane. While varying reaction times can be employed depending on the desired separation, in this embodiment of the invention, it has been found that reaction times of less than about 1 hour are preferred in order to obtain the optimum selective reaction to accomplish the separation. It is evident that this technique distinguishes clearly between cis- and trans-isomeric olefinic compounds in a manner not heretofore possible. Similar results are obtained when other organoboron hydrides, especially the particularly preferred dialkyl boron hydrides as described hereinbefore are substituted and reacted with other cis- and trans-isomeric olefinic compounds of the type described above.

A still further embodiment of the present invention is the reaction of the organoboron hydrides with di-olefinic compounds, e.g. dienes, such as 1,3-pentadiene, 4-vinylcyclohexene, d-limonene, and the like, as further described hereinbefore. Thus, these compounds have two reactive sites within a single molecule and by the process of the present invention, it is possible to selectively attack only one of two or more double bonds in the molecule as desired. Here also, the reaction of the organoboron hydride with the polyolefinic compound is preferably conducted at reaction times of less than about 3 hours, even though longer reaction times can be employed, in order to achieve the most optimum selectivity of reaction.

The following examples will illustrate this particular embodiment of the invention.

EXAMPLE XX

Employing the reactor of Example I, 16.2 g. (0.15 mole) of 4-vinylcyclohexene in 30 cc. of the dimethyl ether of diethylene glycol was added thereto. The reactor was immersed in an ice bath. It was then connected to a flask containing 0.165 mole of di(3-methyl-2-butyl)-boron hydride. Then with agitation, the di(3-methyl-2-butyl)boron hydride was added to the reactor over a period of 1 hour. After standing for an additional 1 hour period at 0° C., 10 cc. of water was added to destroy residual hydride followed by the addition of 50 cc. of 3 N sodium hydroxide and 50 cc. of hydrogen peroxide (30 percent solution). By external cooling, the temperature of this reaction mixture was kept below 50° C. The mixture was then worked up essentially as described in Example I. After distillation, there was obtained 13.7 g. (72 percent yield) of 2-(4-cyclohexenyl)ethanol, B.P. 86–87° at 6 mm. $n_D^{20}$ 1.4834, whereas the reported boiling point is 104.5° at 16 mm. $n_D^{20}$ 1.4832. The 3,5-dinitrobenzoate of the alcohol was prepared, analyzed, and found to have carbon, hydrogen, and nitrogen analysis essentially identical to the calculated values.

EXAMPLE XXI

Employing the procedure of Example XX, to 0.165 mole of di(3-methyl-2-butyl)boron hydride in the dimethyl ether of diethylene glycol at 0° C. was added 20.4 g. of d-limonene (0.15 mole, B.P. 174° at 742 mm. $n_D^{20}$ 1.4730, $[\alpha]_D^{25}$+125°) over a period of 5 minutes. The mixture was allowed to remain approximately 3 hours at room temperature. It was then oxidized as described in the preceding example and the alcohol product worked up. Upon distillation, there was obtained 18.3 parts of primary terpineol (79 percent yield) B.P. 115–116° at 10 mm. $n_D^{20}$ 1.4855, $[\alpha]_D^{20}$+99°, which compares with the reported values in the literature. Again, the 3,5-dinitrobenzoate of the alcohol was prepared and analyzed indicating comparative carbon, hydrogen, and nitrogen values to those reported in the literature.

Thus, the above examples illustrate the selective hydroboration obtained when reacting the organoboron hydrides with polyolefinic materials, especially wherein one olefinic bond is contained in a ring structure and the other olefinic bond is contained in a chain outside the same ring structure or in a different ring structure of the same molecule. Similar results are obtained when other organoboron hydrides and other polyolefinic compounds as described hereinbefore are substituted.

The above examples have illustrated principally two methods for the preparation of the organoboron hydrides employed as a reactant which involve the reactions of diborane or other ·BH₃ producers with an olefinic compound, particularly in the presence of the ethers. The ethers and other Lewis base materials catalyze the hydroboration reaction for forming these materials. Further details concerning this method of producing the organoboron hydrides are presented in my co-pending applications, Serial No. 680,934, filed August 29, 1957, Serial No. 3,975, filed January 21, 1960, and Serial No. 18,491, filed March 30, 1960. Another method for producing the organoboron hydrides involves the reaction of diborane with an olefin in the liquid phase, the liquid phase being accomplished by the use of a hydrocarbon solvent or pre-formed product as a solvent as well as other techniques. This type of processing is set forth in more detail in my co-pending applications, Serial No. 680,933, filed August 29, 1957, now abandoned, and Serial No. 77,504, filed December 22, 1960. Accordingly, the disclosures contained in all of the aforementioned co-pending applications are pertinent to preferred methods for preparing the organoboron hydride reagents and are incorporated by the foregoing references. Still other methods for obtaining the organoboron hydrides are disclosed in my issued U.S. Patents 2,925,441, 2,925,438, and 2,925,437, among others. Other methods for the preparation of the organoboron hydrides will now be evident.

Another convenient method for conducting the process of the present invention is to employ a triorganoborane, preferably the desired product, as a solvent to which is added diborane and the olefin which it is desired to react with the organoboron hydride. By way of particular example, di(3-methyl-2-butyl)-n-hexylborane can be employed as a solvent and then diborane bubbled therethrough in the presence of 1-hexene and in the further presence of one of the catalysts, if desired. In this manner, the diborane will react to form, as a major constituent, di(3-methyl-2-butyl)boron hydride which reacts with the 1-hexene to generate the desired di(3-methyl-2-butyl)-n-hexylborane. A more preferred method involves reacting a triorganoborane with diborane to form the organoboron hydride merely by bubbling the diborane into the reaction mixture, preferably in the presence of an ether, and then add the olefinic compound for reaction with the organoboron hydride as a second step.

Another embodiment of the invention comprises the regeneration of the organoboron hydride starting reagent and removal of the new active group obtained from the olefinic compound reagent by treating the hydroboration product with diborane. This transfers the new grouping to diborane without loss of activity regenerating the original organoboron hydride starting reagent. For this purpose, essentially ½ mole of diborane (or ¼ mole of nascent ·BH₃ producer) per mole of the newly formed triorganoborane resulting from the hydroboration reaction of the organoboron hydride with the olefinic compound is employed with the conditions being essentially as described above. By way of example, in Example I, after the di(3-methyl-2-butyl)boron hydride has been reacted with the 1-hexene to form the di(3-methyl-2-butyl)-n-hexylborane, the latter is then reacted with ½ mole of diborane to produce di(3-methyl-2-butyl)boron hydride and n-hexyl boron dihydride which are separated by conventional techniques. The n-hexyl boron dihydride can then be oxidized as described herein to produce n-hexanol with the di(3-methyl-2-butyl)boron hydride recycled for further reaction with 1-hexene. It will now be evident that such a procedure can be employed in any of the above examples by appropriate modification.

The examples have illustrated primarily one utility of the products of this invention, namely their oxidation, particularly into alcohols. It is to be understood that other methods for performing the oxidation of the boron to carbon bonds are employable. For example, one highly effective method for accomplishing the oxidation is to react the organoboron compound produced with oxygen or air in the presence of either hydrocarbon amines, especially tertiary amines, or ammonia. This reaction is generally conducted at temperatures between about 0 to 150° C. and can even be conducted in the further presence of water thereby producing the alcohol directly rather than going through the intermediate borate ester. Other methods for accomplishing the oxidation will now be evident.

In addition to the above uses of the triorganoboranes produced according to the present invention, they can be reacted with an olefin, particularly a hydrocarbon olefin, and especially the alpha-olefins to displace the organo groups attached to the boron forming a new organoborane and releasing the originally attached organo groups as olefinic compounds. Such a procedure is described in U.S. Patent 2,886,599, and a particularly unique improvement in this procedure is set forth in my co-pending application, Serial No. 836,880, filed August 31, 1959. Thus, for example, in Example I, after the reaction of the di(3-methyl-2-butyl)boron hydride with 1-hexene to form di(3-methyl-2-butyl)-n-hexylborane, the system can be pressurized with propylene and reacted at a temperature between about 150 to 200° C. to produce tri-n-propylborane and primarily 3-methylbutene-2 and hexene-1.

A still further utility for the products obtained according to this invention is their thermal treatment to produce isomeric forms of the organoboranes originally produced. By way of example, the di(3-methyl-2-butyl)-n-hexylborane produced in Example I can be then immediately reacted at temperatures between about 150 to 250° C., especially in the presence of a minor amount of an organoboron hydride as a catalyst, e.g. di(3-methyl-2-butyl)boron hydride, to form as a major product di(3-methyl-n-butyl)-n-hexylborane. Such isomerization procedures are more fully described in my co-pending applications Serial No. 738,307, filed May 28, 1958, Serial No. 857,508, filed December 7, 1959, Serial No. 18,493, filed March 30, 1960, and Serial No. 32,582, filed May 31, 1960, whose disclosures are incorporated herein by reference. Subsequent to this isomerization step, the products can be subjected to a displacement reaction with another olefin as described above.

A still further use for the triorganoboranes produced according to the present invention is their employment in the generation of free radicals by their reaction with an uncomplexed group I–B metal compound in the presence of a strong base. For example, after producing the di(3-methyl-2-butyl)-n-hexylborane as in Example I, there is added thereto essentially 3 moles of silver nitrate and 3 moles of sodium hydroxide per mole of the di(3-methyl-2-butyl)-n-hexylborane and reaction continued at about 25° C. for about 3 hours. In this manner, free radicals are produced which, if not co-acted with another reagent, form hydrocarbon coupled products, particularly dodecane and 2,3,4,5-tetramethylhexane in the ratio of essentially 1:2 moles, respectively. This processing is more fully described in my co-pending application Serial No. 75,110, filed December 12, 1960, whose disclosure is incorporated herein by reference.

In addition to the above uses of the triorganoboranes obtained according to the present invention, they can be employed as "alkylating" agents for producing other organometallic compounds by reacting them with various metal salts, such as mercury, tin, or lead salts, and oxides. Still other uses for the products obtained by the process of the present invention will now be evident.

Having thus described the present invention in its various embodiments, it is not intended that it be limited except as set forth in the following claims.

I claim:

1. The process of selectively hydroborating an olefinic compound which comprises reacting (A) an organoboron hydride in which each organo group is selected from the group consisting of (1) unsubstituted hydrocarbon groups and (2) functionally substituted hydrocarbon groups in which the functional groups are nonreactive to the boron-hydrogen bond with (B) a hydroboratable olefinic compound so that said compound is more selectively hydroborated than when diborane is used.

2. The process of claim 1 further characterized in that said organoboron hydride is a dialkyl boron hydride wherein the carbon atom linked to the boron is a secondary carbon atom, and wherein at least 1 carbon atom beta to the boron has 2 carbon groups attached thereto.

3. The process of claim 1 further characterized in that said organoboronhydride is di(3-methyl-2-butyl)boron hydride.

4. The process of claim 1 further characterized in that the reaction is conducted in the presence of an ether.

5. The process of claim 1 further characterized in that the reaction is conducted at a temperature between about 0 to 50° C.

6. The process of selectively hydroborating an olefinic compound which comprises reacting a dialkylboron hydride with a hydroboratable olefinic compound at a temperature between about 0 to 100° C. so that said compound is more selectively hydroborated than when diborane is used.

7. The process of claim 6 further characterized in that the reaction is conducted in the presence of an ether.

8. The process of selectively hydroborating 1-hexene which comprises reacting di(3-methyl-2-butyl)boron hydride with 1-hexene in essentially equimolar quantities at a temperature between about 0 to 50° C. in the presence of the dimethyl ether of diethylene glycol so that the 1-hexene is more selectively hydroborated than when diborane is used.

9. The process of selectively hydroborating styrene which comprises reacting di(3-methyl-2-butyl)boron hydride with styrene at a temperature between about 0 to 50° C. in the presence of the dimethyl ether of diethylene glycol so that the styrene is more selectively hydroborated than when diborane is used.

10. The process of selectively hydroborating hydroboratable olefinic compounds which comprises reacting (A) an organoboron hydride in which each organo group is selected from the group consisting of (1) unsubstituted hydrocarbon groups and (2) functionally substituted hydrocarbon groups in which the functional groups are nonreactive to the boron-hydrogen bond with (B) a mixture of hydroboratable olefinic compounds so that at least a portion of said mixture is more selectively hydroborated than when diborane is used.

11. A process for the simultaneous preparation of di-(3-methyl-2-butyl)-n-pentylborane and separation of 1-pentene from 2-pentene which comprises reacting a mixture of 1-pentene and 2-pentene with di(3-methyl-2-butyl)boron hydride at a temperature between about 0 to 50° C. in the presence of the dimethyl ether of diethylene glycol.

12. The process of selectively hydroborating a mixture of isomeric olefins which comprises reacting (A) an organoboron hydride in which each organo group is selected from the group consisting of (1) unsubstituted hydrocarbon groups and (2) functionally substituted hydrocarbon groups in which the functional groups are nonreactive to the boron-hydrogen bond with (B) a mixture of isomeric hydroboratable olefins so that at least a portion of said mixture is more selectively hydroborated than when diborane is used.

13. A process for the simultaneous preparation of di-(3-methyl-2-butyl)-2-pentylborane and separation of cis-2-pentene from trans-2-pentene which comprises reacting a mixture of cis- and trans-2-pentene with di(3-methyl-2-butyl)boron hydride at a temperature of 0 to 50° C. in the presence of the dimethyl ether of diethylene glycol.

References Cited in the file of this patent

UNITED STATES PATENTS 2,874,165    Brown _____ Feb. 17, 1959

OTHER REFERENCES

Karrer: Organic Chemistry, 4th ed., pp. 98 to 108 (1950).

Brown et al.: J. Org. Chem., vol. 22, pp. 1137–8 (1957).

Brown et al.: J. Am. Chem. Soc., vol. 82, pp. 4708 to 4712 (Sept. 5, 1960).

Mikhailov et al.: Izvest. Akad. Nauk S.S.S.R., Otdel. Khim. Nauk., pp. 1307–9 (July 1960), abstracted in Chem. Abs., vol. 55, page 360 (1961).